United States Patent [19]

Jerkins

[11] 4,093,421
[45] June 6, 1978

[54] APPARATUS FOR PRODUCING CARBON BLACK

[75] Inventor: Norman M. Jerkins, Rockport, Tex.

[73] Assignee: Ashland Oil, Inc., Ashland, Ky.

[21] Appl. No.: 830,276

[22] Filed: Sep. 1, 1977

Related U.S. Application Data

[63] Continuation of Ser. No. 709,814, Jul. 29, 1976, abandoned.

[51] Int. Cl.$^2$ ............................ C09C 1/48; F23C 5/06
[52] U.S. Cl. .................................... 23/259.5; 423/450; 423/453; 431/174; 431/181; 431/284

[58] Field of Search ............... 23/259.5; 423/450, 455; 431/174, 181, 284, 285, 160

[56] References Cited

U.S. PATENT DOCUMENTS

| 2,344,203 | 3/1944 | Creighton | 431/160 X |
| 3,003,854 | 10/1961 | Heller | 423/450 |
| 3,060,000 | 10/1962 | Williams | 23/259.5 X |

Primary Examiner—James H. Tayman, Jr.

[57] ABSTRACT

An injection assembly for introducing a plurality of laterally spaced sprays of a normally liquid hydrocarbon feedstock into the cracking zone of a carbon black furnace.

5 Claims, 6 Drawing Figures

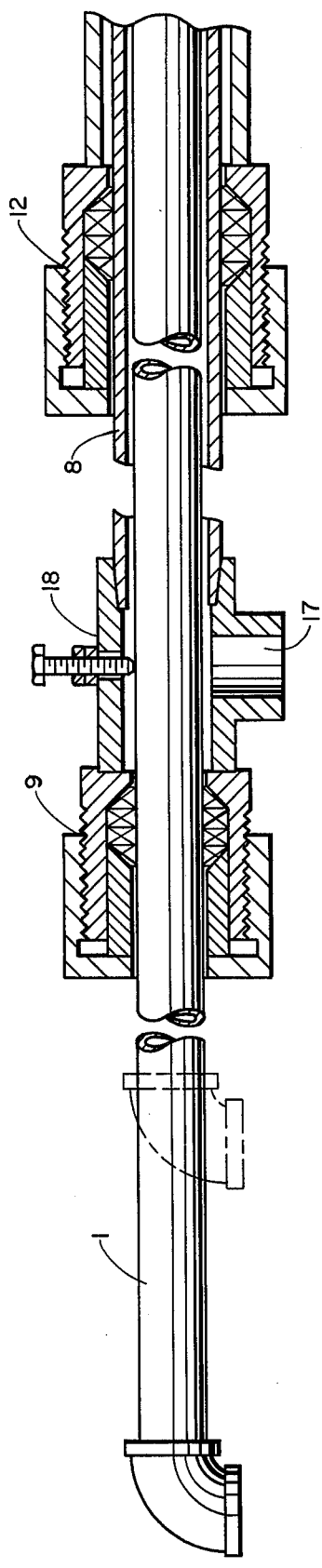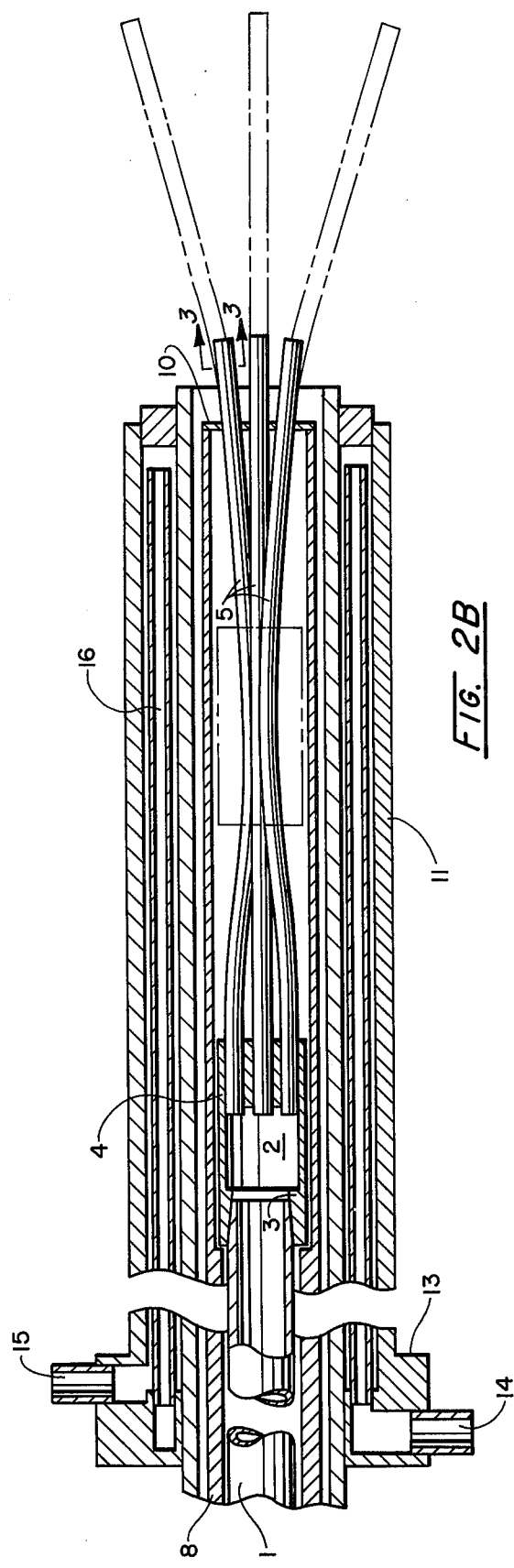

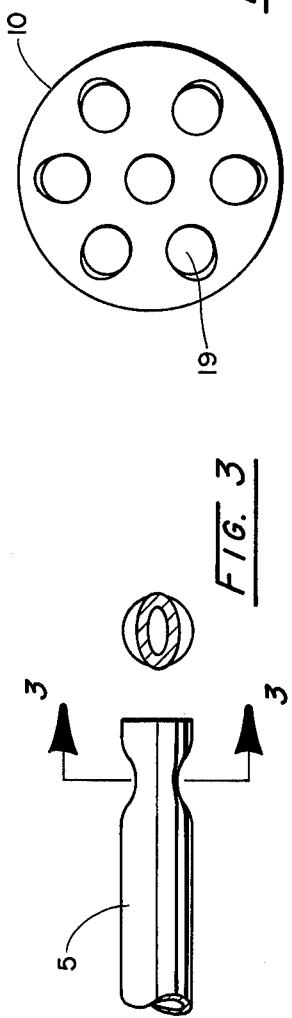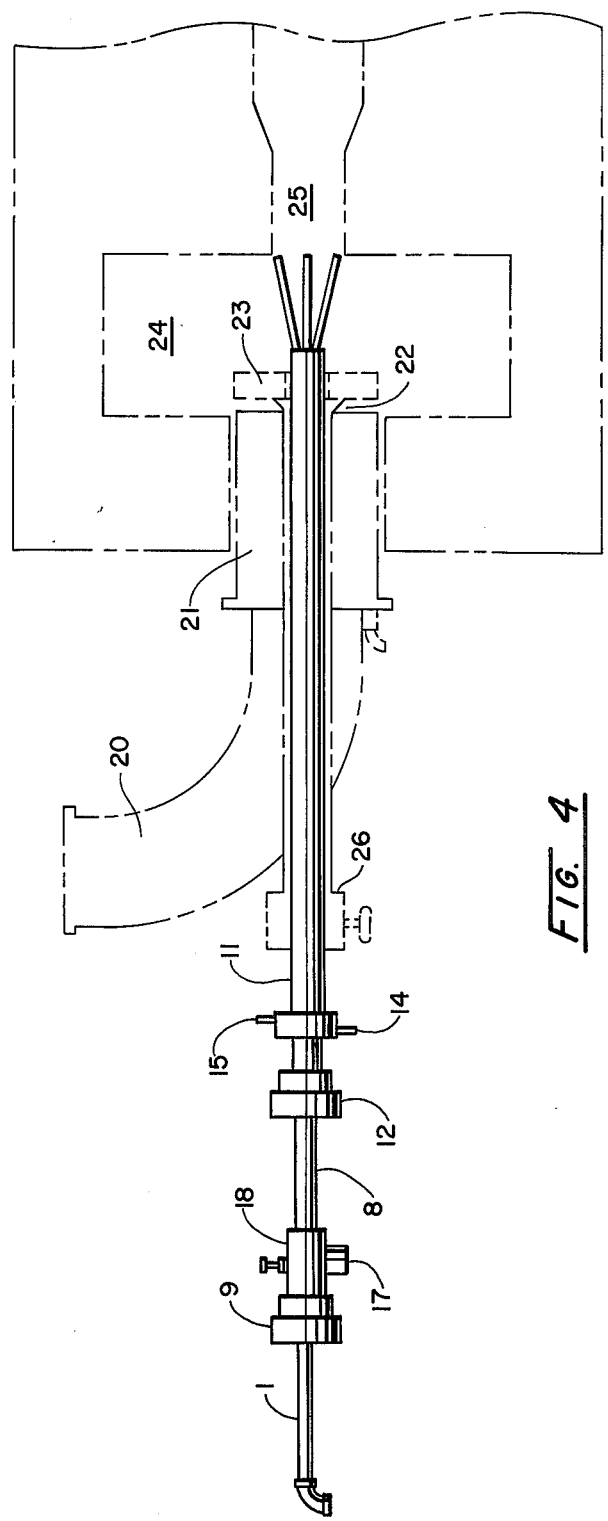

APPARATUS FOR PRODUCING CARBON BLACK

This is a continuation, of application Ser. No. 709,814, filed July 29, 1976, now abandoned.

BACKGROUND OF THE INVENTION

1. Field of the Invention

This invention relates to a carbon black producing feedstock injection apparatus for use in the oil furnace process for the production of tread grade rubber reinforcing carbon black.

2. Description of the Prior Art

The oil furnace process for obtaining high abrasion resistant carbon blacks for rubber reinforcing applications, particularly automotive tires, known in the relevant industry as the HAF, ISAF and SAF types, basically consists of contacting atomized droplets of a normally liquid hydrocarbon feedstock with an extremely turbulent mass of combustion products resulting from burning a mixture of fuel gas and excess pre-heated air. In accordance with the foregoing method, a major portion of the feedstock is pyrolytically dissociated in a partial oxidation reaction to provide a substantial yield of carbon black in the form of an aerosol from whence pulverulent carbon black is recovered and then pelleted.

Beyond the particle size requirement of the respective grades of carbon black mentioned, there are other important quality standards that must be met, foremost of which is structure. Structure is essentially the inherent tendency of the nascent carbon black particles to agglomerate to form chain-like units or clusters of the particles during and immediately subsequent to the completion of the pyrolysis reaction. The structure characteristic is very important insofar as it relates directly to certain critical properties exhibited by cured carbon black reinforced rubber compositions. It will suffice to say, however, that the carbon black manufacturing art as presently practiced is highly sophisticated and thus those skilled in this art are well aware of the combination of processing parameters needed to provide a quality product.

Lately, however, an additional quality standard for tread grade rubber reinforcing carbon black has been assuming importance. Such concerns the particle size distribution of the resultant product. Essentially the improvement being sought in this regard is to produce a product composed of more uniform particle sizes and particularly, the elimination of the larger particle size component associated with the heretofore standard products. In this connection, particle size refers to the size of the resultant agglomerates. These new products are referred to as high tint blacks, named so because of the empirical test method utilized to measure this property.

It is known in the art that the manner whereby the feedstock is injected into the furnace, specifically at or near the center of the situs of maximum turbulency of the cracking gases, leads to the formation of high tint black. However, this expedient results in a product having unacceptably low structure properties. In order to increase structure, the feedstock injector can be moved upstream of the high turbulence zone to provide for a broader feedstock spray pattern as it enters the high turbulence zone. This unfortunately attenuates tint by increasing the agglomerate size distribution, so to compensate the reaction time must be shortened. This practice, however, reduces yield and calls for an expensive drying operation to rid the final product of unreacted oil so that the carbon black will meet the stain test imposed by the consuming rubber industry. It is, accordingly, the object of this invention to provide a feedstock injector whose use in the oil furnace process facilitates the production of high tint carbon black without experiencing the shortcomings mentioned above.

SUMMARY OF THE INVENTION

In accordance with the present invention an injection assembly is provided which is adapted to permit the introduction of a normally liquid hydrocarbon feedstock into a carbon black furnace as a variably spaced array of individual atomized sprays thereof. The contemplated assembly, from the standpoint of design, basically comprises a pipe housing encompassing a plurality of feedstock supply tubes connected to a common source of the feedstock. The feedstock supply lines are adjustable as a unit so as to permit projecting the individual discharge ends thereof from the corresponding end of the housing which in operation remains as a stationary part of the assembly affixed to the upstream closure end of the furnace. The terminal downstream segments of said feedstock supply tubes are angularly preformed so as to allow the discharge ends thereof to assume a spaced circular pattern when projected beyond the housing. The diameter of said circular pattern is proportional to the longitudinal extent the feedstock supply tubes are projected beyond the housing, said longitudinal positioning being accomplished from without the furnace.

BRIEF DESCRIPTION OF THE DRAWINGS

FIG. 2A is a sectional view, partly in elevation, along plane 2A—2A of FIG. 1;

FIG. 2B is a sectional view, partly in elevation, along plane 2B—2B of FIG. 1;

FIG. 3 is a fragmentary elevational view of the nozzle discharge end of the feedstock supply tubes (5) as shown in FIG. 2B and a sectional view thereof taken along lines 3—3.

FIG. 4 is a diagrammatic illustration of the placement of the feedstock injection assembly of FIG. 1 in a carbon black furnace utilizing a choke section for developing turbulent effluent flow conditions therein.

FIG. 5 is an end-on transverse view of shroud closure plate (10) of FIG. 2B.

DESCRIPTION OF THE PREFERRED EMBODIMENTS

Figure 1:
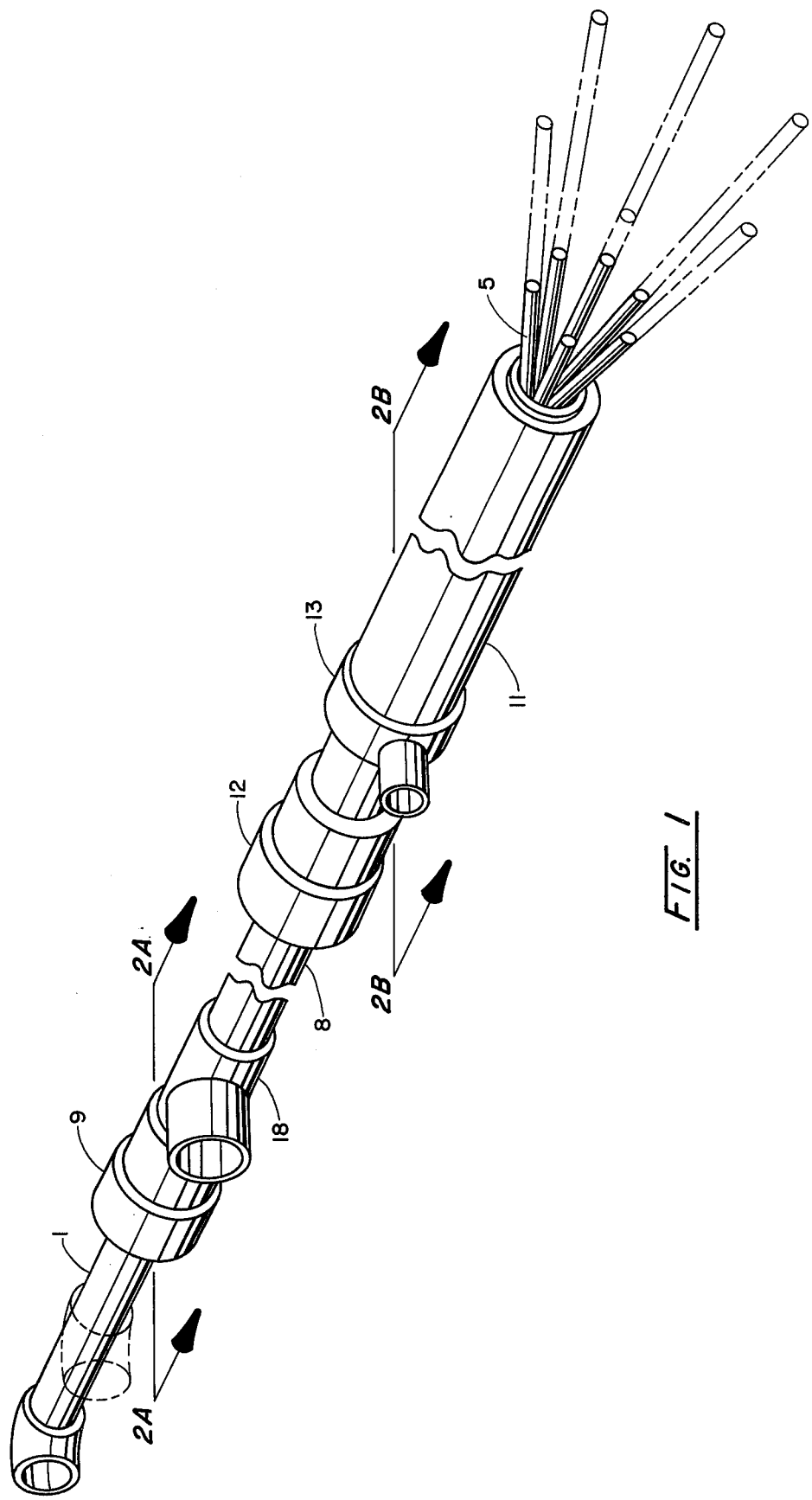
FIG. 1 is an overall isometric view of the feedstock injection assembly.

For the purpose of describing how the feedstock injector of this invention is intended to be used in practice, it would be firstly desirable to discuss generally but briefly the furnace design commonly utilized in the production of the abrasion resistance types of rubber reinforcing carbon black. While operational variants such as feedstock rate, air pre-heat temperature a rate, duration of the reaction, as well as the composition of the feedstock a important in implementing the production of abrasion resistant blacks, the design of the furnace nevertheless remains as the most important factor. Essentially all of the commerical furnaces of the type under consideration are composed of two main structural parts; the first or upstream portion being the combustion chamber wherein a mixture of a fuel, preferably natural gas, and an excess of combustion supporting gas, generally air, is combusted. The combustion chamber is invariably of tubular design having a diameter substantially larger than the length thereof. The other structural component of the furnace consists of the reaction zone wherein the carbon producing feedstock is for the most part dissociated into carbon black. This part of the furnace is in direct communication and centrally aligned with the downstream end of the combustion chamber. The reaction zone is likewise tubular but having a diameter substantially smaller than the length thereof. The reaction zone is provided with quench ports at various distances longitudinally removed from the upstream opening thereof whereby quench water can be introduced to terminate the cracking reaction after the desired duration.

Two modes of effluent flow are applicable in the operation of the aforedescribed furnace design. In one mode of operation the combustion air and fuel are introduced tangentially into the combustion chamber. The combusted gas accordingly enters into the reaction zone in an inwardly spiralling pattern and in so doing leads to the formation of extremely turbulent conditions therein especially near the upstream opening.

The other effluent flow pattern observed is that of axial flow whereby the combustion air and fuel are burned in the combustion chamber and introduced into the reaction zone in a generally linear manner. This type of flow does not create the highly turbulent conditions within the reaction zone as does the tangential flow method and therefore the upstream extremity of the reaction zone is provided with a choke or a venturi configuration in order to realize the degree of turbulency required.

The linear flow method of operation is preferred in the utilization of this invention. A particularly suitable design for operating in the foregoing manner is the type of furnace generally illustrated in FIG. 4. Complete details with respect to this design of a furnace and the operation thereof can be found in U.S. Pat. No. 3,060,003.

With reference to FIG. 4 preheated combustion air is introduced into the plenum 20 and flows axially within conduit 21 to combine with the fuel gas from jets 22. The flame and the resultant combustion products are directed radially outwardly by the deflector element 23. The hot combustion gases thereupon flow generally axially within the combustion chamber 24 near the peripheral extent thereof and then proceed radially downwardly along the downstream end of the combustion chamber and into the choke 25. Accordingly, the velocity as well as turbulency of the combustion gases are maximized in the choke section. The reactor effluent then flows into the enlarged reaction zone or tunnel and is quenched downstream by introducing sprays of water into the tunnel.

As further shown in FIG. 4, the individual feedstock supply tube discharge ends of the injection assembly of FIG. 1 are positioned contiguous to and in axial alignment with the upstream opening of the choke. Desirably, the injection assembly is designed so that the discharge end of the radially extendible feedstock supply tubes will, when the latter are fully extended, lie within and adjacent to the periphery of the choke opening. In this position the tint and structure of the resultant carbon black will be maximized. In the event less structure is desired the radially extended portion of the supply tubes can be re-positioned inwardly to the degree which provides the level of structure desired, without reducing tint.

As it is apparent from the foregoing discussion, the feedstock injector resides within the furnace where it is subjected to intense heat exposure, generally in the order of 2800° F. or more. Accordingly, it is essential that the unit be compact in order to minimize the area exposed to the high heat environment and to permit it to be removed from the furnace for periodic servicing through gate valve 26 without the necessity of shutting down the furnace. Compactness in itself, however, will not serve to protect the injector for any extended period let alone maintain the feedstock below cracking temperature and therefore the unit must be provided with cooling means as a practical expedient, all as will be set forth in connection with the detailed description of the invention given below.

For a detailed description of the injector assembly of FIG. 1 reference will now be had to FIGS. 2A and 2B. Feedstock supply pipe (1) connects to feedstock distribution chamber or manifold (2) fabricated from pipe fitting piece (3) and header piece (4). Feedstock supply pipe (1) can acceptably be ½ inch SCH 80 black pipe. Six lengths of stainless steel tubing (5) of ⅛ inch ID equally spaced on a ¾ inch diameter circle are brazed into the header (4). A like length of the tubing is brazed into the center of header (4).

The integral combination of feedstock supply pipe (1), manifold and feedstock supply tubes (5) is positioned within pipe shroud (8) via feedstock supply pipe locking mechanism (18) by means of packing gland (9). Pipe shroud (8) can be acceptably a 1 inch SCH 40 pipe which is provided with closure plate (10) drilled to accommodate freely the projection of said feedstock supply tubes therethrough. FIG. 5 illustrates in detail the preferred manner contemplated for constructing shroud closure plate (10). Firstly, marginally oversized holes, typically 7/32 inch for the indicated ⅛ inch ID feedstock supply tubing, are drilled perpendicularly to the face of the closure plate. Each hole is then redrilled at about a 45° angle at approximately a right angle to the adjacent peripheral edge of the plate. Pipe shroud (8) is of sufficient length so as to allow the ends of feedstock supply tubes (5) to be pulled back substantially flush with the outside face of shroud closure plate (10). Shroud (8) is appropriately provided with an interior shoulder as shown in FIG. 2B with which pipe fitting piece (3) abuts to prevent retraction of the feedstock supply tubes through shroud closure plate (10) into the shroud.

It can be further noted from FIG. 2B that the circumferentially disposed feedstock supply tubes (5) are angularly preformed so as to result in the discharge ends thereof assuming a spaced circular pattern upon the longitudinal positioning of said supply tubes forwardly with respect to the shroud closure plate (10). As shown in detail in FIG. 3, the feedstock supply tube discharge ends are desirably flared and then crimped to provide a nozzle type configuration in order to facilitate atomization of the feedstock.

As previously mentioned, it is necessary to provide means for cooling the portion of the injection assembly disposed within the furnace. With reference to FIGS. 2A and 2B, such is accomplished in the depicted injector by providing the downstream part thereof with a water-cooled jacket generally shown at (11). The water jacket can be permanently affixed to the shroud member or constitute a removal part as shown, connected to the assembly by means of packing gland (12). Where an integral part of the assembly, the water jacket can serve as the shroud in which arrangement closure plate (10) is affixed to the upstream end thereof.

The water-cooled jacket is preferably fabricated from heat resistant stainless steel and is appropriately connected at the upstream end thereof to a cooling water manifold shown generally at (13). Cooling water manifold (13) is composed of two sections. Inlet section (14) is adapted for introducing the cooling water and outlet section (15) is adapted for discharging same. The inlet section (14) of the manifold communicates directly with the interior of the cooling jacket by means of quadrantly spaced tubes (16) which extend longitudinally to near the downstream extremity of the jacket thereby permitting the cooling water to discharge into the jacket at this location and to return and exit through outlet section (15) of the manifold. Insofar as there is a tendency for blow back to occur within the downstream interior of the shroud member, it is desirable to provide additional cooling means in order to prevent the shroud closure plate (10) and the adjacent portion of the feedstock supply tubes from overheating. This can be readily accomplished by introducing compressed air in the inlet section (17) of the locking mechanism (18), such cooling air exiting through the shroud closure plate (10).

What is claimed is:

1. In a furnace-type reactor for the production of abrasion-resistant grades of rubber-reinforcing carbon black, said furnace having a tubular combustion chamber for effecting the burning of gaseous fuel therein whose diameter is substantially larger than the length thereof and whose downstream end is in open communication with an elongated axially aligned tubular reaction zone having a diameter substantially smaller than that of said combustion chamber, and means for injecting a normally liquid carbon black producing feedstock, centrally positioned within said chamber and adapted to introduce the feedstock axially into said reaction zone; the improvement wherein said feedstock injection means comprises:

a pipe shroud member fixedly and centrally positioned with respect to the upstream closure end of said combustion chamber and in axial alignment therewith, said shroud member having an upstream and downstream closure end, the latter freely accommodating the passage of the metallic feedstock supply tubes as hereinafter defined;

a feedstock suppy pipe concentrically disposed within said shroud member adapted to be longitudinally extended in the downstream direction and retracted in the upstream direction and whose upstream end projects beyond the upstream closure end of the pipe shroud member;

a cylindrical manifold rigidly attached to and in open communication with the downstream end of said feedstock suppy pipe and the header end of which is provided with a centrally located circular port and a plurality of like ports circumferentially disposed thereabout;

a metallic feedstock supply tube rigidly connected to and in axial alignment with said centrally located circular port and whose discharge end is about flush with the face of the pipe shroud member downstream closure end upon retraction of said feed stock supply pipe to its upstream excursion limit; and a metallic feedstock supply tube of approximately the length of said centrally disposed feedstock supply tube rigidly connected to each of said circumferentially disposed header ports and permanently angularly preformed so that the discharg ends thereof assume an expanded circular pattern contiguous to and within the periphery of the opening of said reaction zone upon positioning same downstream of said pipe shroud member downstream closure end by extending said feed stock supply pipe beyond said upstream excursion limit thereof.

2. An injection assembly in accordance with claim 1 wherein the linear portion thereof disposed within a furnace is provided with a water-cooled jacket.

3. An injection assembly in accordance with claim 2 having means for introducing cooling air into said shroud member near the upstream extremity thereof.

4. An injection assembly in accordance with claim 3 having six feedstock supply tubes disposed about said concentrically disposed feedstock supply tube.

5. An injection assembly in accordance with claim 4 wherein said water-cooled jacket is an integral part thereof.

* * * * *